Sept. 16, 1958      F. W. MAGIN      2,852,654
BROILER AND METHOD OF BROILING
Filed May 14, 1956
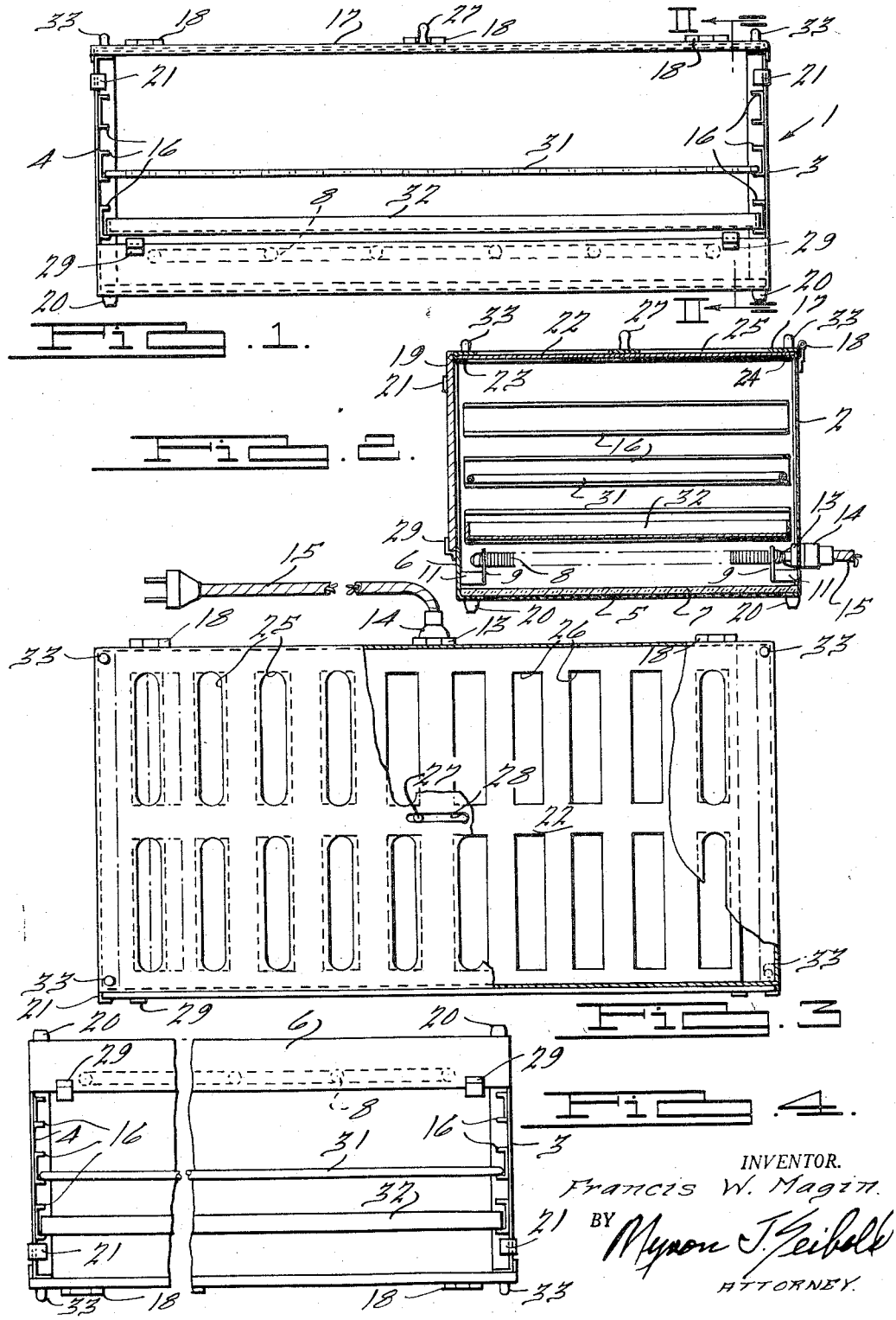
INVENTOR.
Francis W. Magin
BY Myron J. Seibold
ATTORNEY.

United States Patent Office 2,852,654
Patented Sept. 16, 1958

2,852,654

BROILER AND METHOD OF BROILING

Francis W. Magin, Detroit, Mich., assignor to Square D Company, Detroit, Mich., a corporation of Michigan Application May 14, 1956, Serial No. 584,624

2 Claims. (Cl. 219—35)

This invention relates to an appliance and method for cooking and more particularly to a broiler adapted to provide an arrangement for imparting an improved flavoring to an article during the cooking thereof in the manner known as broiling.

During the cooking of an article in the manner known as broiling, certain juices will be exuded from the article. These juices will fall either onto the source of radiant energy employed to broil the article or into a drip pan adapted for the purpose of collecting the by-products of the broiling. If the juices fall into the radiant energy source, the most natural consequence is that they will be there burned in proximity to the article being broiled. Broilers of previous design have sometimes employed elaborate arrangements for directing the path of these vaporized juices away from the article on the premise that such vapors impart to the article being broiled a burned taste derived from the vapors. Others have attempted through various means to prevent the exuded juices from reaching the source of radiant energy so as to eliminate the supposed cause of the burned taste. Others have believed that an improved flavor of charcoal broiled articles is due to the condition that charcoals of a particular origin are employed.

Applicant has determined, however, that any improved flavor of broiled articles is not necessarily due to the use of particular charcoals but is due to the enveloping of the article being broiled in an atmosphere of vaporized flavor particles produced by volatilizing the juices exuded from the article during its broiling. Therefore, in contrast to previous broilers and broiling methods, the broiler and method of broiling of this invention deliberately volatilize the juices produced during broiling and direct the vapors about the article being broiled to envelop the article with these vapors, thus to impart to the article the flavors previously carried away by other broilers.

The object of the present invention is a broiler of improved construction wherein an article being broiled is so broiled in an atmosphere of vaporized juices produced during the broiling operation.

A further object of the present invention is the provision of the arrangement for volatilizing the juices exuded from an article during broiling.

A further object of the present invention is the provision of an arrangement for directing vaporized drippings and juices exuded from an article during the broiling thereof into contact with the article being broiled.

A further object of the present invention is an invertible broiler adapted to provide a broiling element either above or below an article to be broiled.

A further object of the invention is the method of broiling whereby articles being broiled are so broiled in an atmosphere containing volatilized components of their own juices to impart flavoring to the article.

Other objects and features of the invention will be readily apparent to those skilled in the art from the specification and appended drawings illustrating a certain preferred embodiment in which:

Figure 1 is a front elevational view of the broiler with front cover removed and showing the relative positions of the heating elements, the vaporizing pan and the grill members.

Figure 2 is a sectional view taken along the lines II—II of Figure 1.

Figure 3 is a top plan view of the broiler of the present invention illustrating the venting arrangement for the top of the broiler.

Figure 4 is a front elevational view of the broiler in an inverted position to provide an overhead broiling arrangement.

The broiler of the present invention constitutes a sheet metal enclosure 1 having a back wall 2, side walls 3 and 4, a bottom 5, and a turned up partial front wall 6. An insulating sheet 7 is fixed to the bottom wall 5, and above the sheet 7 an electrical heating unit 8 is provided passing in a serpentine fashion along the bottom of the broiler 1. The heating element 8 is mounted on suitable support members 9 spaced by insulating members 11 from the back wall 2 and front wall 6 of the enclosure. The heating element 8 terminates in a power receptacle 13 at the rear of the broiler and the receptacle is provided with a conventional adapter into which may be plugged a connector 14 of a power cord 15. A suitable plurality of vertically spaced, channel shaped support brackets 16 are provided on each of the side walls 3 and 4 at the interior surfaces thereof, to provide for the adjustable support of members within the broiler as will be more fully explained hereinafter and the enclosure is provided with supporting legs at 20 on the bottom 5.

The broiler is provided with top and front covers to effect a substantially complete closure thereof while allowing for access to the interior of the broiler. The top cover 17 is hinged at 18 to the back wall 2 of the enclosure. The front cover 19 is slidably supported between guides 21 fixed at the front of the broiler to the side walls 3 and 4, and registers in its closed position with bottom brackets 29 fixed to the partial cover 6, being readily removable from the broiler beyond the guides 21. The top cover 17 is hinged to provide complete opening of the broiler thereat and has a slidable venting plate 22 supported between the inner surface and flanges 23 and 24 thereof. The cover 17 is further provided with a series of oblong slots 25 cut therethrough and the venting plate 22 has complementary spaced cut-out areas 26 which may be slidably aligned in varying degree with the cut-out portions 25 of the cover 17 to permit an adjustment of the ventilation provided through the cover for the broiler. The adjustment of the venting is accomplished by maneuvering the plate 22 with respect to the cover 17 by movement of the external handle 27 which is fixed at the inside to the venting plate 22 and extends through a suitable cut-out 28 in the cover 17.

The cover 19 is slidably supported on the enclosure of the broiler at the front between guides 21 and may be of glass construction if desired so that observation may be made therethrough to the articles being broiled within the broiler. The cover may be raised in a sliding manner to provide access to the interior of the broiler for removal of articles being broiled therein or for repositioning of the same within the enclosure and may be completely removed from the enclosure with ease by merely sliding it beyond the guides 21 into a free position.

The interior of the broiler is provided with a rack 31 and a sheet metal plate 32 both of suitable size to be supported on the side channel 16 at the interior of the enclosure. The plate 32 is preferably constructed of a sheet metal material which will not be detrimentally affected by extreme heats and not easily oxidized or tarnished. An example of such a material would be stainless steel, although this specification is not necessarily restricted thereto.

The broiler of this invention, although somewhat conventional in appearance, performs a broiling operation which imparts to the article being broiled the special and improved flavors of its broiling process. The components of the broiler function in a manner to insure the flavor improvement through the envelopment of the article being broiled in an atmosphere of vaporized gases of the juices exuded from the article during broiling and returned to the atmosphere by contact with a heated element of the broiler. In the operational use of the broiler, an article to be broiled may be placed upon the rack 31 and positioned within the broiler at any of the plurality of selectable heights as provided by the side channels 16. The broiler may have been preheated or may at this time be connected to a source of suitable electrical power through the connecting cable 15 in a manner to energize the heating coils 8 of the broiler. The pan 32 is maintained in close proximity to the heating elements 8 in order to be heated thereby and to operate as the radiant heater itself to accomplish the broiling operation of the article being supported on the rack 31 for broiling.

During the process of broiling, certain juices contained within the article being broiled will be exuded through the pores thereof so as to drop toward the bottom of the broiler to come in contact with the heated pan 32. These juices will then be vaporized and returned to the atmosphere as gases to surround the article being broiled with the vaporized juices. In this manner certain savory flavors will be added to the article being broiled to produce the effect sometimes attributed to charcoal broiling without, however, the undesirable features of charcoal broiling involved with the use of coals.

The cover of the broiler provides for the circulation and control of the atmosphere within the broiler through the provision of a venting arrangement. The top cover 17 may be either completely hinged away from the surface of the broiler or may be adjusted to permit only restricted flow of gases from the broiler to retain the vaporized juices in the atmosphere in which the article being broiled is supported. The front door 19 of the broiler permits observation of the progress of the article being broiled and may also function to permit a ventilating action in the case of excessive heating or other condition of desirable venting in the broiler.

While the broiler of this invention is adapted by specific design to function in the manner previously described, the broiler may also function in a somewhat conventional fashion as an overhead broiler, in which case the complete broiler is inverted so as to sit on its cover on suitable legs as shown at 33 and the pan 32 is removed from its position adjacent to its heating element 8 for repositioning below the rack 31 to operate as a catch pan for juices produced during the broiling operation. The front cover 19 will be removed in this positioning of the broiler in that it is not required to contain the cooking atmosphere as in the preferred broiling method. In this position, the heating element 8 will be above the article being broiled and will produce the cooking effect without the benefits of the vaporized atmosphere feature as in the broiling operation as shown in Figure 2.

The features of this invention are not necessarily limited to broiling in that the device may be provided with a rotisserie type support between the channels 16 so that roasting may be performed within the broiler while still maintaining the article being cooked in the atmosphere of its own vaporized juices. This and other adaptations of the device for other cooking duties in which the vaporized products of cooking are employed should be obvious to the user and are intended to be covered by the term "broiling" as used in the appended claims.

While a certain preferred embodiment of the invention has been disclosed, it is understood that the invention is not necessarily limited thereto, as many variations will be readily apparent to those skilled in the art and the invention is to be given its broadest possible interpretation within the terms of the following claims.

What is claimed is:

1. A portable heating device of the character described, comprising in combination; an enclosure including a pair of vertical side walls held in spaced relation by a vertical back wall, a plurality of U-shaped support members horizontally disposed and vertically spaced on the sidewalls to provide a plurality of pairs of oppositely facing horizontally aligned support members along the side walls within the enclosure, a horizontally extending wall immovably connected to the side and back walls, support means carried by the horizontal wall for supporting the enclosure when the enclosure is positioned so the horizontal wall forms a bottom wall therefor, a second horizontal wall hingedly mounted to the back wall for movement for exposing the interior of the enclosure and vertically spaced from the first horizontal wall, support means extending from the second horizontal wall arranged to support the enclosure when the enclosure is positioned so the second horizontal wall forms the bottom of the enclosure, an imperforate vaporizing pan slideably received between the pair of support members adjacent the first horizontal wall when said wall forms the bottom of the enclosure, a heating element disposed between the vaporizing pan and first horizontal wall and positioned in close proximity to the vaporizing pan for vaporizing the contents of the pan, a perforate support rack positionable slidingly in another pair of support members between the vaporizing pan and second horizontal wall, a transparent wall slidingly supported by the side and first horizontal wall to provide a removable front wall for the enclosure, and an adjustable vent carried by the second horizontal wall for controlling the vapors surrounding the perforate support which are generated in the vaporizing pan by the heating element.

2. A portable heating device of the character described, comprising in combination; an enclosure including a pair of vertical side walls held in spaced relation by a vertical back wall, a plurality of support members horizontally disposed and vertically spaced on the side walls to provide a plurality of pairs of oppositely facing horizontally aligned support members along the side walls within the enclosure, a horizontally extending wall immovably connected to the side and back walls, support means carried by the horizontal wall for supporting the enclosure when the enclosure is positioned so the horizontal wall forms a bottom wall therefor, a second horizontal wall hingedly mounted to the back wall for movement for exposing the interior of the enclosure and vertically spaced from the first horizontal wall, support means extending from the second horizontal wall arranged to support the enclosure when the enclosure is positioned so the second horizontal wall forms the bottom of the enclosure, an imperforate vaporizing pan slideably received between the pair of support members adjacent the first horizontal wall when said wall forms the bottom of the enclosure, a serpentine electric heating element disposed between the vaporizing pan and first horizontal wall and positioned in close proximity to the vaporizing pan for vaporizing the contents of the pan, a perforate support rack positionable slidingly in another pair of support members between the vaporizing pan and second horizontal wall, a transparent wall slidingly supported by the side and first horizontal wall to provide a removable front wall for the enclosure, and an adjustable vent carried by the second horizontal wall for controlling the vapors surrounding the perforate support which are generated in the vaporizing pan by the heating element.

(References on following page)

References Cited in the file of this patent

UNITED STATES PATENTS

| | | |
|---|---|---|
| 1,434,792 | Neitro | Nov. 7, 1922 |
| 1,843,486 | Kahn | Feb. 2, 1932 |
| 1,903,477 | Rolfson | April 11, 1933 |
| 1,912,568 | Lorenzo | June 6, 1933 |
| 1,961,391 | Reedy et al. | June 5, 1934 |
| 2,137,898 | McKee | Nov. 22, 1938 |
| 2,199,584 | Bemis | May 7, 1940 |
| 2,538,567 | Jones | Jan. 16, 1951 |
| 2,608,190 | Winning et al. | Aug. 26, 1952 |
| 2,618,730 | Panken | Nov. 18, 1952 |
| 2,706,473 | Armstrong | Apr. 9, 1955 |
| 2,796,060 | Binns | June 18, 1957 |